Patented Apr. 17, 1934

1,955,060

UNITED STATES PATENT OFFICE

1,955,060

PRODUCTION OF DIMETHYLOL KETONES AND THE PRODUCT THEREOF

Walter Flemming, Ludwigshafen-on-the-Rhine, and Horst-Dietrich v. d. Horst, Mannheim, Germany, assignors to I. G. Farbenindustrie Aktiengesellschaft, Frankfort-on-the-Main, Germany No Drawing. Application June 15, 1931, Serial No. 544,680. In Germany June 25, 1930

8 Claims. (Cl. 260—134)

The present invention relates to the production of dimethylol-ketones i. e. dimethylol-acetone and its homologues.

Acetone and formaldehyde or its polymers have already been brought into reaction under different conditions. Insoluble strongly colored resins are usually obtained. Under very mild conditions, especially on carrying out the condensation in a solution of weak alkalinity the hydrogen-ion concentration of which is below a value of pH=10 or by employing alkaline reacting salts, mainly monomethylolacetone is formed but dimethylol ketones have never been obtained in a pure form.

We have now found that by employing caustic alkalies, pure dimethylol compounds of aliphatic ketones can be obtained when the caustic alkalies are used in such a high quantity that the alkalinity of the solution is kept at a value above pH=10, preferably at from pH=10.3 to pH=11.3, care being taken that the temperature, which without cooling very soon rises to the boiling point, is kept between 0° and 60° C., generally between 5° and 60° C. Instead of acetone, its homologues, as for example methyl ethyl ketone or other aliphatic saturated ketones may be employed, and instead of formaldehyde other substances, which yield formaldehyde under the conditions of working, as for example polymers of formaldehyde, such as paraformaldehyde, trioxymethylene, or dimethylol urea may be employed.

It is preferable to work with about the calculated amounts, namely with a ratio of 2 molecular proportions of aldehyde to each molecular proportion of ketone, but dimethylol compounds are obtained according to the present invention with proportions which deviate considerably from the said ratio, such as up to 9 molecular proportions of ketone per 2 molecular proportions of aldehyde.

The following examples will further illustrate the nature of this invention but the invention is not restricted to these examples. The parts are by weight.

Example 1

966 parts of a 30 per cent aqueous formaldehyde solution and 98 parts of twice-normal aqueous caustic soda solution are added to 237 parts of acetone (pH=10.5). The reaction vessel is allowed to stand at from 10° to 15° C. for from 8 to 12 hours while cooling well. After the said time, the mixture is neutralized with twice-normal aqueous sulphuric acid and the solution is evaporated at about 40° to 80° C. at about 20 millimeters (mercury gauge). A slightly viscous liquid remains behind, and this is dissolved in a 96 per cent ethyl alcohol in order to remove sodium chloride or sulphate, filtered and evaporated again at about 20 millimeters (mercury gauge) and 80° C. The yield is 434 parts of dimethylolacetone, which is a colorless viscous liquid corresponding to the formula $CH_3$—$CO$—$CH(CH_2OH)_2$ and which cannot be distilled without decomposition at 16 millimeters of mercury and 180° C., being thereby converted into a compound boiling at 81° C. at the said pressure and corresponding to the formula $C_5H_8O_2$.

The resulting dimethylolacetone can be further worked up for example into lacquers or varnishes, assistants for the textile industries or for the production of solid artificial masses.

Example 2

966 parts of a 30 per cent aqueous formaldehyde solution and 98 parts of twice-normal aqueous caustic potash solution are added to 288 parts of methyl ethyl ketone. The reaction vessel is allowed to stand for from 8 to 12 hours care being taken by cooling well that the temperature in the vessel does not exceed 20° C. After the said time the mixture is accurately neutralized with hydrochloric acid and the water as well as the small amount of unconverted ketone is evaporated at about 20 millimeters (mercury gauge) and 80° C. An oil remains behind and is dissolved in methyl alcohol to remove the salt formed during the neutralization, the salt being precipitated. The mixture is filtered and the alcohol is evaporated at about 20 millimeters (mercury gauge) and 80° C. The remaining dimethylol methyl ethyl ketone is a pale yellow clear liquid of great purity which has the viscosity of glycerol and solidifies after some time to form white needle-like crystals having a melting point of about 62° C. The product may be employed as the initial material for the purposes referred to in Example 1.

Dimethylol methyl ethyl ketone $$(CH_3—CO—C(CH_2OH)_2—CH_3)$$

cannot be quickly distilled in vacuo without partial decomposition but at a slow distillation at 16 millimeters of mercury and 140° C. no decompostion occurs.

Example 3

16 parts of aqueous twice-normal caustic soda solution are added to a suspension of 5 parts of ethyl alcohol, 30 parts of trioxy-methylene and 29 parts of acetone; the mixture is stirred until the trioxy-methylene has been dissolved, while preventing the temperature of the reaction mixture from rising to above 50° C. After standing for 2 hours the solution is rendered neutral with aqueous 2-N hydrochloric acid and is then worked up as described in Example 1.

What we claim is:

1. The process for the manufacture of dimethylol ketones which comprises acting with formaldehyde at a temperature between 0° and 20° C. on an aliphatic saturated ketone selected from the group consisting of ketones containing 3 and 4 carbon atoms, in the presence of water and of a quantity of caustic alkali capable of providing in the reaction mixture a hydrogen-ion concentration of a pH value above 10.

2. The process for the manufacture of dimethylol ketones which comprises acting with 2 molecular proportions of formaldehyde at a temperature between 0° and 20° C. on at least one molecular proportion of an aliphatic saturated ketone selected from the group consisting of ketones containing 3 and 4 carbon atoms, in the presence of water and of a quantity of caustic alkali capable of providing in the reaction mixture a hydrogen-ion concentration of a pH value above 10.

3. The process for the manufacture of dimethylol ketones which comprises acting with about 2 molecular proportions of formaldehyde at a temperature between 0° and 20° C. on at least one molecular proportion of an aliphatic saturated ketone selected from the group consisting of ketones containing 3 and 4 carbon atoms, in the presence of water and of a quantity of caustic alkali capable of providing in the reaction mixture a hydrogen-ion concentration of a pH value above 10.

4. The process for the manufacture of dimethylol ketones which comprises acting with 2 molecular proportions of formaldehyde at a temperature between 0° and 20° C. on at least one molecular proportion of acetone, in the presence of water and of a quantity of caustic alkali capable of providing in the reaction mixture a hydrogen-ion concentration of a pH value above 10.

5. The process for the manufacture of dimethylol ketones which comprises acting with 2 molecular proportions of formaldehyde at a temperature between 0° and 20° C. on at least one molecular proportion of methyl ethyl ketone, in the presence of water and of a quantity of caustic alkali capable of providing in the reaction mixture a hydrogen-ion concentration of a pH value above 10.

6. Pure dimethylol compounds of aliphatic saturated ketones selected from the groups consisting of ketones containing 3 and 4 carbon atoms.

7. Dimethylol acetone which is a colorless viscuous liquid which corresponds to the formula $C_5H_{10}O_3$ and is decomposed on distillation at about 16 millimeters of mercury and 180° C. into a compound $C_5H_8O_2$ having a boiling point of 81° C. at about 16 millimeters of mercury.

8. Dimethylol methyl ethyl ketone which has a melting point of about 62° C. and can be slowly distilled without decomposition at 140° C. and 16 millimeters of mercury.

WALTER FLEMMING.
HORST-DIETRICH v. D. HORST.